United States Patent
Vestergaard et al.

(10) Patent No.: US 6,619,554 B1
(45) Date of Patent: Sep. 16, 2003

(54) INTEGRATED CIRCUIT CARD FOR USE IN A COMMUNICATION TERMINAL

(75) Inventors: Peter Vestergaard, Humlebaek (DK); Rune Lindholm, Salo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/979,945

(22) PCT Filed: Jun. 2, 2000

(86) PCT No.: PCT/IB00/00823
§ 371 (c)(1), (2), (4) Date: May 28, 2002

(87) PCT Pub. No.: WO00/76239
PCT Pub. Date: Dec. 14, 2000

(30) Foreign Application Priority Data

Jun. 3, 1999 (DK) ........................... 1999 00792

(51) Int. Cl.[7] ........................... G06K 5/00; G06K 19/06
(52) U.S. Cl. ........................ 235/492; 235/380
(58) Field of Search ................. 235/380, 441, 235/382, 381, 383, 375, 379, 492, 486, 487

(56) References Cited

U.S. PATENT DOCUMENTS

| | | | | |
|---|---|---|---|---|
| 4,868,376 A | * | 9/1989 | Lessin et al. | 235/492 |
| 5,448,765 A | | 9/1995 | Kovanen et al. | 455/90 |
| 5,814,798 A | | 9/1998 | Zancho | 235/380 |
| 6,003,113 A | * | 12/1999 | Hoshino | 711/106 |
| 6,220,510 B1 | * | 4/2001 | Everett et al. | 235/380 |
| 6,317,832 B1 | * | 11/2001 | Everett et al. | 713/172 |
| 6,402,028 B1 | * | 6/2002 | Graham et al. | 235/380 |
| 6,425,522 B1 | * | 7/2002 | Matsumoto et al. | 2350/380 |

FOREIGN PATENT DOCUMENTS

| | | | | |
|---|---|---|---|---|
| DE | 38 38 677 | | 11/1988 | H04Q/7/00 |
| FR | 2 748 834 | | 5/1996 | G06F/12/00 |

OTHER PUBLICATIONS

Scott B. Guthery, "JAVA CARD: Internet Computing on a Smart Card", IEEE Internet Computing, US, IEEE Service Center, Piscataway, NJ, Feb. 1, 1997, pps. 57–59.
International Search Report.

* cited by examiner

Primary Examiner—Thien M. Le
(74) Attorney, Agent, or Firm—Antonelli, Terry, Stout & Kraus, LLP

(57) ABSTRACT

The invention is an integrated circuit card for use in a communication terminal, the integrated circuit card including a controller, a memory, and a user-interface for communication with a controller of the communication terminal. The integrated circuit card controller controls a plurality of client application programs which are selectively activated for the user on the communication terminal. The integrated circuit card includes a non-volatile memory included in the memory; the integrated circuit card controller allowing a user to selectively activate and deactivate applications included in the plurality of client applications; and the integrated circuit card controller storing information about the status of the selectively activated client application programs in the non-volatile memory; and wherein the information about status is used after deactivation of the card when the card is reactivated to activate in the communication terminal any client application program which was active at the time of deactivation of the card.

21 Claims, 2 Drawing Sheets

INTEGRATED CIRCUIT CARD FOR USE IN A COMMUNICATION TERMINAL

BACKGROUND OF THE INVENTION

1. Field Of The Invention

The invention concerns application control in communication terminals having an exchangeable integrated circuit care.

2. Description of the Prior Art

In a multi-application smart card many applications may be active simultaneously. When a user with a multi-application card activates the smart card the user may wish to have the possibility to continue the sessions which were active when the card was last de-activated.

SUMMARY OF THE INVENTION

The invention is an integrated circuit card for use in a communication terminal for re-activating applications which were active when the card was de-activated.

The integrated circuit card is for use in a communication terminal, the integrated circuit card having a controller, a memory, and a user-interface for communication with a controller of the communication terminal, the integrated circuit card controller controls a plurality of client application programs which are able to be activated selectively by the user on the communication terminal, the integrated circuit card comprises a non-volatile memory included in the memory; the integrated circuit card controller allows the user to selectively activate and deactivate applications included in the plurality of applications; and the integrated circuit card controller stores information about the status of the selectively activated client application programs in the non-volatile memory. Hereby the applications of e.g. a phone will be re-activated in the same state as when the card was de-activated. It is important to note that the card is responsible for storing the information about the reactivation or the default configuration of applications. When the card is transferred from a first to a second communication terminal the same applications will be re-activated in the second communication terminal as were de-activated in the first communication terminal.

The invention is also applicable when the user wishes to start the same configurable session (thus called default configuration) each time the user activates the communication terminal.

Preferably, when activating the communication terminal, the controller of the integrated circuit card reads the information about the status of the selectively activated client application programs and activates the applications included in the plurality of applications accordingly. Thereby the client application programs started up by a phone supporting the invention will have the same status as when the phone was switched off or having the default configuration.

The status of the selectively activated client application programs is stored as a Data Object containing a TAG field identifying the Data Object, a LENGTH field indicating the overall length of the Data Object, and a Value field (Data Element) containing the status information. This Data Object refers to a list of applications supported by the card being stored in an elementary directory file of e.g. a SIM card for GSM or for third generation smart cards.

According to an alternative embodiment, a list of applications supported by the card is stored in an elementary directory file and the status information present in the Data Object refers to the list of applications. The number of applications is restricted to the maximum number, and status of the selectively activated client application programs is included in a Data Object containing a TAG field identifying the Data Object; a Length field and a Value field (Data Element) containing the status information.

The integrated circuit card controller allows the user to selectively activate and deactivate applications included in the plurality of applications, and the integrated circuit card controller stores information about the status of the selectively activated client application programs in the non-volatile memory. When the card is transferred from a first to a second communication terminal, the same applications well be re-activated in the second communication terminal as were de-activated in the first communication terminal.

According to the preferred embodiment, the integrated circuit card may be used as a Subscriber Identity Module (SIM Card) for a portable phone. Basically the integrated circuit card may be provided as a Subscriber Identity Module (SIM) for the GSM specification as described in the specification "Digital cellular telecommunication system (Phase 2+); Specification of the Subscriber Identity Module-Mobile Equipment (SIM-ME) interface GSM 11.11 version 7.1.0 Release 1998" from the European Telecommunication Standards Institute (ETSI). Section 11 of the GSM document defines the application protocol for GSM network operation involving the SIM interface with the communication terminal. Section 10 of the GSM document defines the content and the structure of the record stored in the memory of the SIM card.

However, the invention is related to Integrated Circuit Cards (ICC) and the invention may find use in W-CDMA (third generation cellular communication). Integrated circuit cards are standardized in the "International Standard ISO/IEC 7816-5, Identification Cards -Integrated circuit(s) cards with contacts" from the International Electrotechnical Commission. Section 5 of this document handles the structure of Data Objects stored as records in an ICC memory (SIM card memory).

Smart cards and their operation are described in chapter 4 of the book Smart Cards written by JoséLuis Zoreda and Jose Manuel Otón, Artech House, Inc, 1994.

DESCRIPTION OF THE PREFERRED EMBODIMENTS

Figure 1:
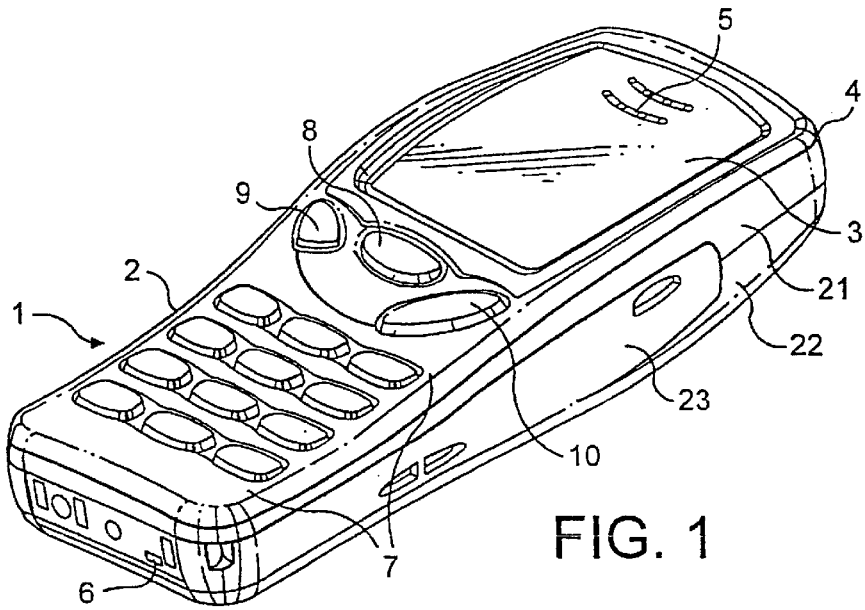
FIG. 1 schematically illustrates a preferred embodiment of a hand portable phone using an integrated circuit card according to the invention.

FIG. 1 shows a preferred embodiment of a phone according to the invention, and it will be seen that the phone, which is generally designated by 1, comprises a user interface having a keypad 2, a display 3, an on/off button 4, a speaker 5, and a microphone 6 (only openings are shown). The phone 1, according to the preferred embodiment, is adapted for communication via a cellular network, e.g. a GSM network. However the invention may be implemented in any other communication terminal using an integrated card or a smart card.

According to the preferred embodiment, the keypad 2 has a first group 7 of alphanumeric keys, two soft keys 8, two call handling keys 9, and a navigation key 10. The present functionally of the soft keys 8 is shown in separate fields in the display 3 just above the keys 8, and the call handling keys 9 are used for establishing a call or a conference call, terminating a call or rejecting an incoming call.

Figure 2:
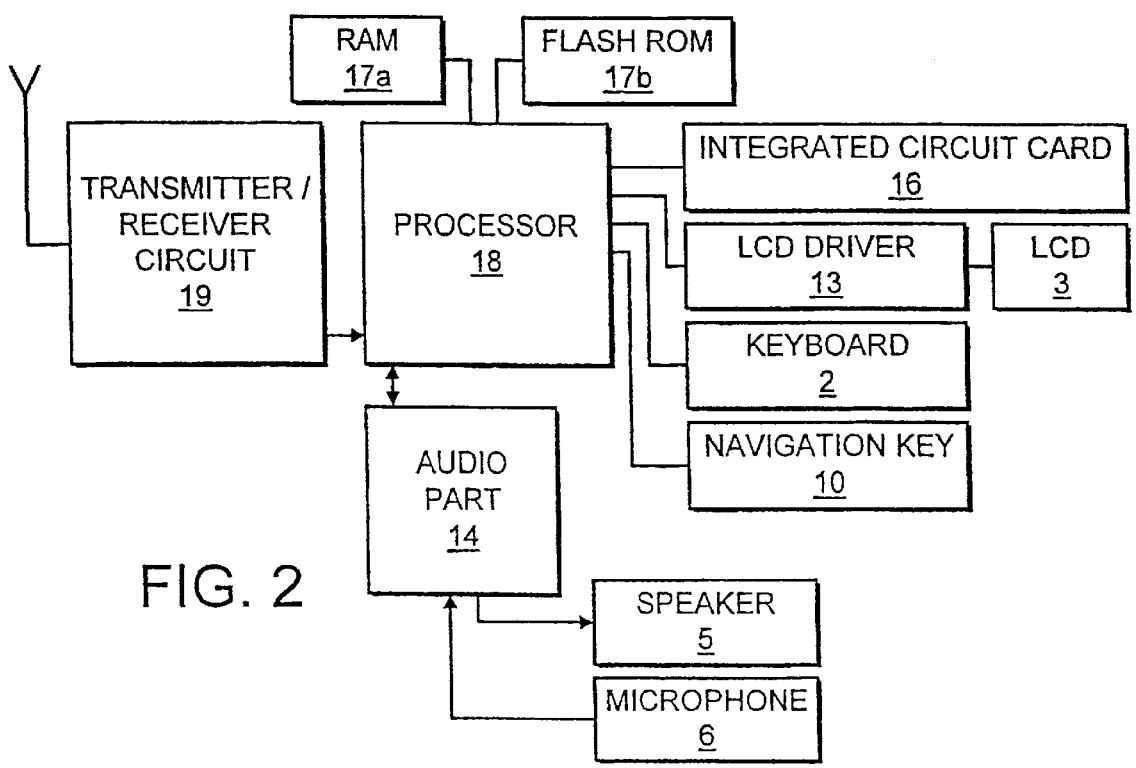
FIG. 2 schematically shows the essential parts of a telephone for communication with a cellular network.

FIG. 2 schematically shows the most important parts of a preferred embodiment of the phone, the parts providing an understanding of the invention. The preferred embodiment of the phone of the invention is for use in connection with the GSM 900 MHz and GSM 1800 MHz network, but, of course, the invention may also be applied in connection with other phone networks. The processor 18 controls the communication with the network via the transmitter/receiver circuit 19 and an antenna 20 that will be discussed in detail below.

The microphone 6 transforms the user's speech into analog signals, the analog signals being A/D converted in an A/D converter (not shown) before the speech is encoded in an audio part 14. The encoded speech signal is transferred to the processor 18, which supports the GSM terminal software. The processor 18 also forms the interface to the peripheral units of the apparatus, including a RAM memory 17a and a Flash ROM memory 17b, an integrated circuit card 16 (for GSM a SIM card), the display 3 and the keypad 2 (as well as data, power supply, etc.). The audio part 14 speech-decodes the signal, which is transferred from the processor 18 to the earpiece 5 via a D/A converter (not shown).

Figure 3:
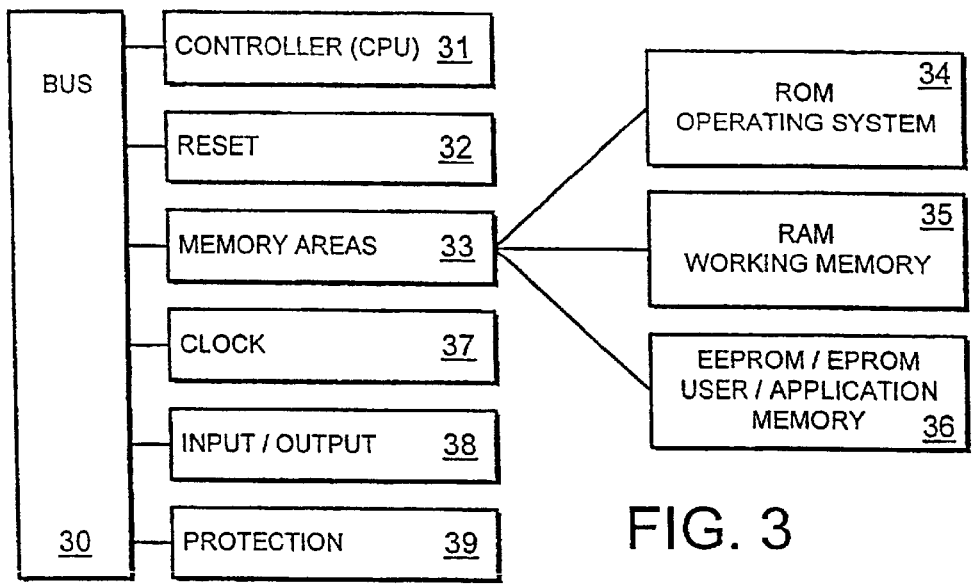
FIG. 3 schematically shows the essential parts of an integrated circuit card according to the invention.

The architecture of the integrated circuit card 16 is discussed in detail with reference to FIG. 3. Basically a smart card (integrated circuit card 16) includes a Central Processing Unit (CPU) 31, a memory area 33 including memories 34–36, protection circuits 39, a reset circuit 32, a clock 37 and an input-output 38 (including the terminal pads on the card). Smart cards have permanent or non-volatile memory for most applications and memory zones. Volatile memory also be included as intermediate memory storage for e.g. direct code execution. All these units may communication via a common bus 30 and the controller 31 may communication with the processor 18 in the phone 1 via the input-output 38 of the integrated circuit card 16.

A volatile memory (RAM, working memory 35) is provided as Dynamic Random Access Memory (DRAM) and/or Static Random Access Memory (SRAM), while a non-volatile Memory is provided as Read Only Memory (ROM including an operating system 34) and Erasable, Programmable Read-Only Memory (EPROM (or EEPROM), user/application memory 36).

The volatile memory (RAM) 35 may serve several purposes, but when the power is switched off the content of the memory will be lost after a while. However, the SRAM does not need to be refreshed and therefore the data storage has a very low power consumption. The SRAM is used as a working area, e.g. a RAM stack where intermediate results, e.g. from an encryption or acknowledgement procedure is stored. After finishing a step in the procedure the data is erased.

The user/application memory 36 is the most important memory on the card fro the users point of view. The user/application memory 36 is provided as an EPROM or an EEPROM and holds the specific information on every application. The information is usually a data set including user data, issuer data, and operations performed by the card. In some cases the user/application memory 36 may also contain executable functions. The user/application memory 36 is protected by the controller 31, which filters the data flow, manages data storage and reading, and runs pre-programmed executable functions.

The microcircuits of the integrated circuit card 16 are almost a complete computer system without keyboard and display. Instead the User Interface is constituted by the terminals (input-output 38) provided on the integrated circuit card 16. The core of the card's microcircuit is the controller 31 (a microprocessor usually called a CPU). The CPU executes an instruction set that ultimately defines the capabilities of the card. Preferably the instruction set is permanently wired into the card 16. Higher level functions are permanently stored in the card memory, indicating to the CPU what to do, when, and how to do it. These functions could be considered as being the operating system of the card 16. The operating system of the card allows the CPU to manage the user/application memory according to external commands the user invokes from the phone interface. The microprocessor (controller 31) of the card 16 always takes care of the memory management (for the memories on the card) and the data security. Any external (from the phone) access to the card memory or functions is performed through the CPU (controller 31). The operating system of the card 16 is also used to define executable functions eventually stored in the user/application memory 36.

It is a general feature in the ISO 7816 standard and related specifications that when a Dedicated File (DF—a file stored on an ICC (Integrated Circuit Card) and containing access conditions and, optionally, other Dedicated Files) or Elementary Files (EF—a file stored on an ICC and containing access conditions and data and no other files) is selected, a number of File Control Information (FCI) bytes can be read. However the invention may work for other EF's as well, i.e. the storing of the status parameters is generic.

According to the preferred embodiment of the invention, an $EF_{DIR}$ file contains a list of applications as well as an indication about where the applications can be found and some textual description about where the applications can be found and some textual description of the application. An $EF_{DIR}$ file is an elementary directory file containing a list of applications supported by the card. Detailed descriptions of solutions on 7816 and GSM compliant cards are listed below. However it should be noted that the solutions below are not restricted to cards complying to the two mentioned standards.

According to the invention, the user can in a Default Configuration Mode defines a set of default applications which are activated when the communication terminal is started up.

ISO 7816 Compliant Cards

In an ISO 7816 compliant card, a Data Object (TLV) is provided in the File Control Information (FCI) bytes containing information about the present status of the applications in the communication terminal according to the invention. When the communication terminal is switched on, this information indicates which of the applications that were active when the last session was terminated. Alternatively the communication terminal is switched on in a default configuration. The Data Object (TLV), shown in FIG. 4, has a TAG 50, e.g. having the length of one byte. This TAG 50 identifies the Data Object as being a Data Object that indicates the status of the applications in the communication terminal. The Data Object (TLV) has furthermore a LENGTH field 51 indicating the overall length of the Data Object (TLV). The LENGTH field 51 has the length of e.g. one byte and indicates the number of bytes present in the Data Object (TLV).

The third part of the Data Object (TLV) is a Value field 52 (Data Element) and this field contains the status information. It is the responsibility of the operating system on the card to ensure that the fields are updated correctly. If the first application stored in the $EF_{DIR}$ file was activated, then A1 is set to the binary value "1", otherwise it is set to "0" and so on.

Figure 4:
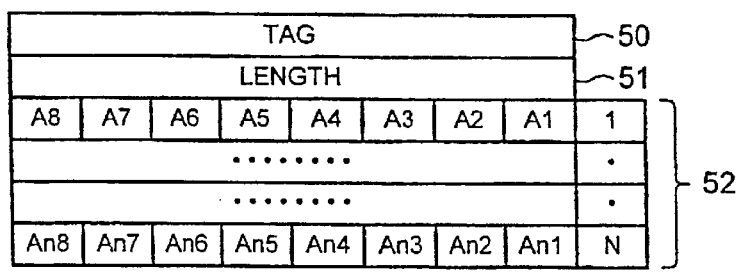
FIG. 4 shows the structure of a Data Object according to the preferred embodiment of the invention.
Figure 5:
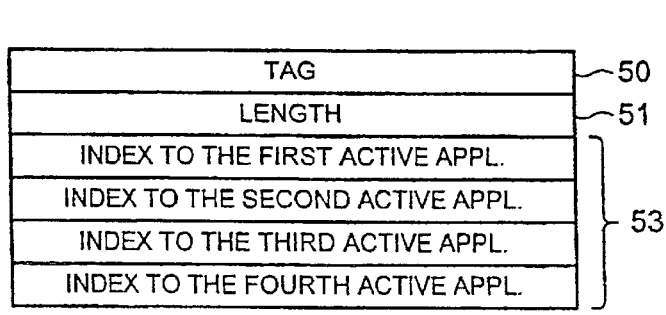
FIG. 5 shows the structure of a Data Object according to a first alternative embodiment of the invention.

Preferably, the number N in FIG. 4 of active applications is likely to be restricted to the maximum number of logical channels, that is currently 4, another proposal is listed. This is illustrated in FIG. 5.

In this case, an index 53, in the $EF_{DIR}$ file, to the applications active during the last session is given in the File Control Information (FCI). The LENGTH field 51 may be omitted if the maximum number is fixed, e.g. is limited to 4 (or if it is later agreed that even though more than 4 can be active 4 is the default value). If an index 53 is not used, it shall be initialized to a specific predetermined value (e.g. 0×FF).

GSM 11.11 Compliant Cards

Figure 6:
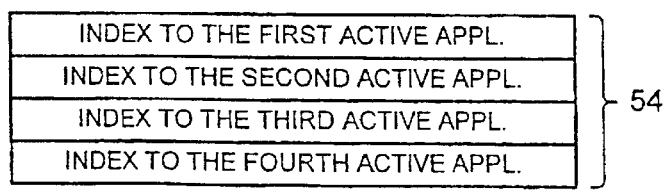
FIG. 6 shows the structure of a Data Object according to a second alternative embodiment of the invention.

For GSM 11.11 compliant cards, it is proposed to add to the response bytes a number of bytes each containing an index 54 (FIG. 6) in the $EF_{DIR}$ file for the applications that were active when the card was last de-activated—this is similar to the embodiment discussed with reference to FIG. 5 except that the TAG field 50 and the LENGTH field 51 has been omitted.

Presently the relevant number of bytes required is equal to the number of logical channels. Furthermore if an index is not used, it shall be initialized to a specific predetermined value (e.g. 0×FF).

According to the invention, the Integrated Circuit Card can be in one of the following states. In an automatic mode, the applications active (as indicated in the TLV defined above) during the last session are re-activated at start-up and the appropriate Card Holder Verification (CHV) can be entered (Default configuration mode). The Card Holder Verification information includes access conditions used by the SIM for the verification of the identity of the user.

In manual mode, the list of all the applications stored in the card is presented to the user and it is then up to the user to select which applications he wishes to activate. The same will be valid for third generation (W-CDMA) cellular systems.

According to the preferred embodiment of the invention, the controller 31 stores the information about active applications in the user/application memory 36 of the integrated circuit card 16. This means that the phone 1 when switched on starts applications having the same status as when the phone 1 was switched off or in the default configuration. Furthermore the invention ensures that the phone 1 when switched on with a SIM transferred from another phone starts applications having the same status as when the other phone was switched off.

The Integrated Circuit Card may somewhere in the memory include an indication of some preferred applications. The list may be used when the Integrated Circuit Card is in a kind of automatic mode—and this list is somewhat similar to the PLMN preferred list but is extended to contain only non-telecom applications, e.g. banking applications.

We claim:

1. An integrated circuit card for use in a communication terminal, the integrated circuit card including a controller, a memory, and a user-interface for communication with a controller of the communication terminal, the integrated circuit card controller controlling a plurality of client application programs which are selectively activated for the user on the communication terminal, the integrated circuit card comprising:

a non-volatile memory included in the memory;

the integrated circuit card controller allowing a user to selectively activate and deactivate applications included in the plurality of client applications; and the integrated circuit card controller storing information about the status of the selectively activated client application programs in the non-volatile memory; and wherein the information about status is used after deactivation of the card when the card is re-activated to activate in the communication terminal any client application program which was active at the time of deactivation of the card.

2. An integrated circuit card according to claim 1, wherein;

the integrated circuit card controller, when activating the terminal, reads the information about the status of the selectively activated client application programs and activates the applications included in the plurality of applications accordingly.

3. An integrated circuit card according to claim 1, wherein;

the status of the selectively activated client application programs is included in a data object containing a tag field identifying the data object, a length field indicating an overall length of the data object, and a value field containing status information.

4. An integrated circuit card according to claim 3, wherein;

a list of applications supported by the card is contained in an elementary directory file and the status information present in the data object refers to the list of applications.

5. An integrated circuit card according to claim 1, wherein;

a list of applications supported by the card is contained in an elementary directory file and the status information present in the data object refers to a list of applications and wherein a number of applications is restricted to the maximum number, status of the selectively activated client application programs is included in a data object containing a tag field identifying the data object, and a value field containing the status information.

6. An integrated circuit card according to claim 2, wherein:

the status of the selectively activated client application programs is included in a data object containing a tag field identifying the data object, a length field indicating an overall length of the data object, and a value field containing status information.

7. An integrated circuit card according to claim 2, wherein:

a list of applications supported by the card is contained in an elementary directory file and the status information present in the data object refers to a list of applications and wherein a number of applications is restricted to the maximum number, status of the selectively activated client application programs is included in a data object containing a tag field identifying the data object, and a value field containing the status information.

8. An integrated circuit card in accordance with claim 1 wherein:

the terminal in which the card is re-activated is a same terminal in which the card was deactivated.

9. An integrated circuit card in accordance with claim 2 wherein:

the terminal in which the card is re-activated is a same terminal in which the card was deactivated.

10. An integrated circuit card in accordance with claim 3 wherein:

the terminal in which the card is re-activated is a same terminal in which the card was deactivated.

11. An integrated circuit card in accordance with claim 4 wherein:

the terminal in which the card is re-activated is a same terminal in which the card was deactivated.

12. An integrated circuit card in accordance with claim 5 wherein:

the terminal in which the card is re-activated is a same terminal in which the card was deactivated.

13. An integrated circuit card in accordance with claim 6 wherein:

the terminal in which the card is re-activated is a same terminal in which the card was deactivated.

14. An integrated circuit card in accordance with claim 7 wherein:

the terminal in which the card is re-activated is a same terminal in which the card was deactivated.

15. An integrated circuit in accordance with claim 1 wherein:

the terminal in which the card is re-activated is a different terminal than a terminal in which the card is deactivated.

16. An integrated circuit in accordance with claim 2 wherein:

the terminal in which the card is re-activated is a different terminal than a terminal in which the card is deactivated.

17. An integrated circuit in accordance with claim 3 wherein:

the terminal in which the card is re-activated is a different terminal than a terminal in which the card is deactivated.

18. An integrated circuit in accordance with claim 4 wherein:

the terminal in which the card is re-activated is a different terminal than a terminal in which the card is deactivated.

19. An integrated circuit in accordance with claim 5 wherein:

the terminal in which the card is re-activated is a different terminal than a terminal in which the card is deactivated.

20. An integrated circuit in accordance with claim 6 wherein:

the terminal in which the card is re-activated is a different terminal than a terminal in which the card is deactivated.

21. An integrated circuit in accordance with claim 7 wherein:

the terminal in which the card is re-activated is a different terminal than a terminal in which the card is deactivated.

\* \* \* \* \*